United States Patent [19]
Reid

[11] Patent Number: 5,138,978
[45] Date of Patent: Aug. 18, 1992

[54] AQUATIC ANIMAL FEEDING ASSEMBLY

[76] Inventor: Bruce A. Reid, 203-2929 Carling Ave., Ottawa, Ontario,, Canada, K2B 8E7

[21] Appl. No.: 764,533

[22] Filed: Sep. 24, 1991

[30] Foreign Application Priority Data

Nov. 9, 1990 [CA] Canada ................. 2029610

[51] Int. Cl.⁵ .............................................. A01K 61/02
[52] U.S. Cl. ................. 119/51.04; 119/51.13
[58] Field of Search ............ 119/5, 51.04, 51.13; 222/650, 160

[56] References Cited

U.S. PATENT DOCUMENTS

| | | | |
|---|---|---|---|
| 1,989,298 | 1/1935 | Tingley | 119/51.13 |
| 2,900,022 | 8/1959 | Friedman | 222/650 |
| 4,130,089 | 12/1978 | Moran | 119/51.04 |
| 4,157,770 | 6/1979 | Roos | 222/650 |
| 4,429,660 | 2/1984 | Olsen et al. | 119/51.04 |
| 4,834,025 | 5/1989 | Tum | 119/51.04 |

Primary Examiner—John G. Weiss
Attorney, Agent, or Firm—Whitham & Marhoefer

[57] ABSTRACT

This invention relates to an assembly for the automatic feeding of aquatic animals, particularly fish, in an aquarium. In use the assembly is disposed atop an aquarium or atop an aquarium hood with an opening congruous with a passage of a feed chute contained in the assembly. The end-user fills each compartment of a train, mounted on a steeply sloping ramp, with particulate or flake-type feed of his or her choosing. The train is restrained, from sliding down and dumping its contents through an aperture in the ramp, by a string connected to a float in a reservoir suspended in fluid communication above an evaporation tray. Liquid that evaporates from the tray is replaced with liquid from the reservoir, causing the float to descend. As the float descends, the attached train is allowed to advance under gravity's pull. Upper surface of the ramp forms a bottom for the train; hence, as the train advances over the aperture the feed falls freely through the aperture, down the chute and into the aquarium.

10 Claims, 2 Drawing Sheets

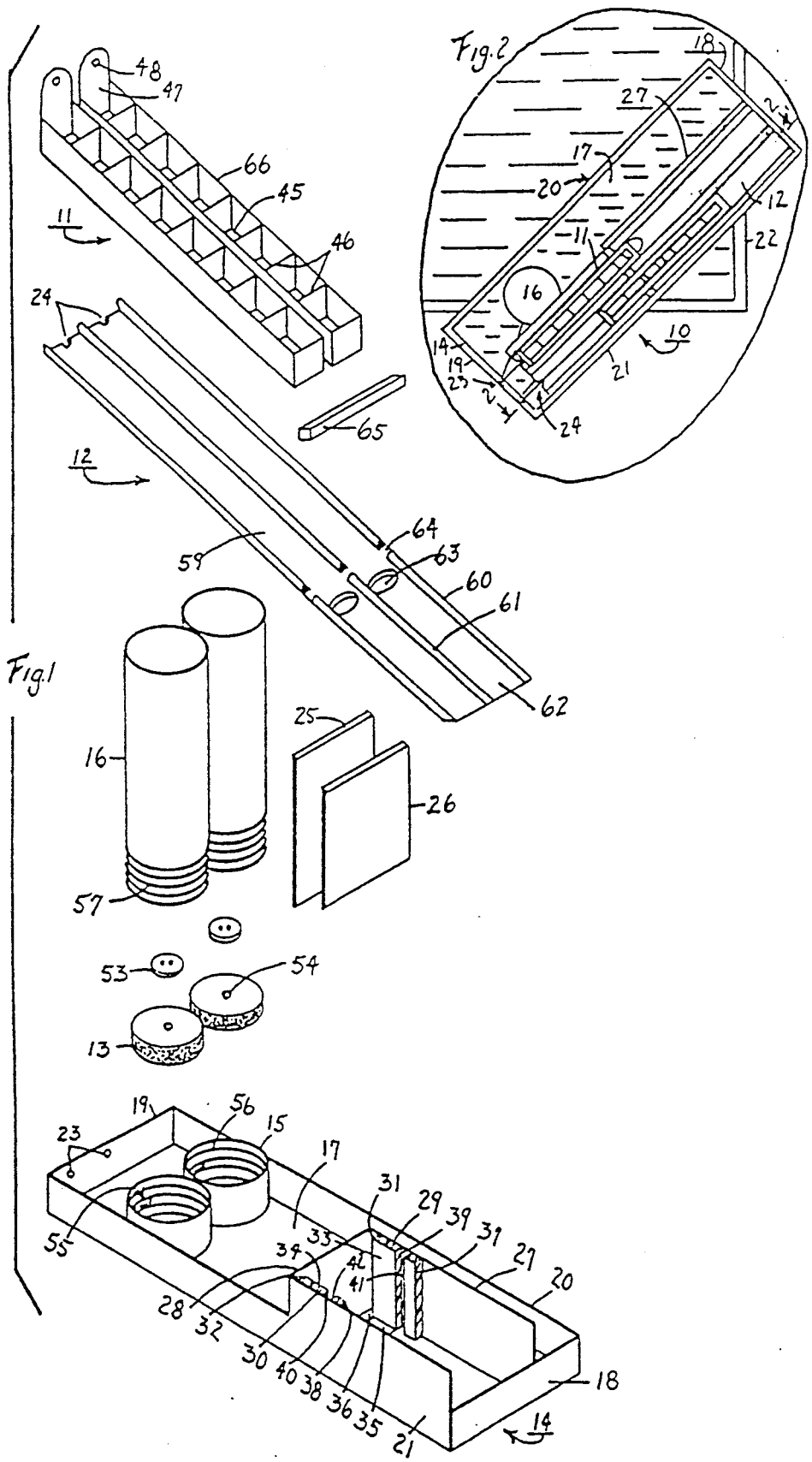

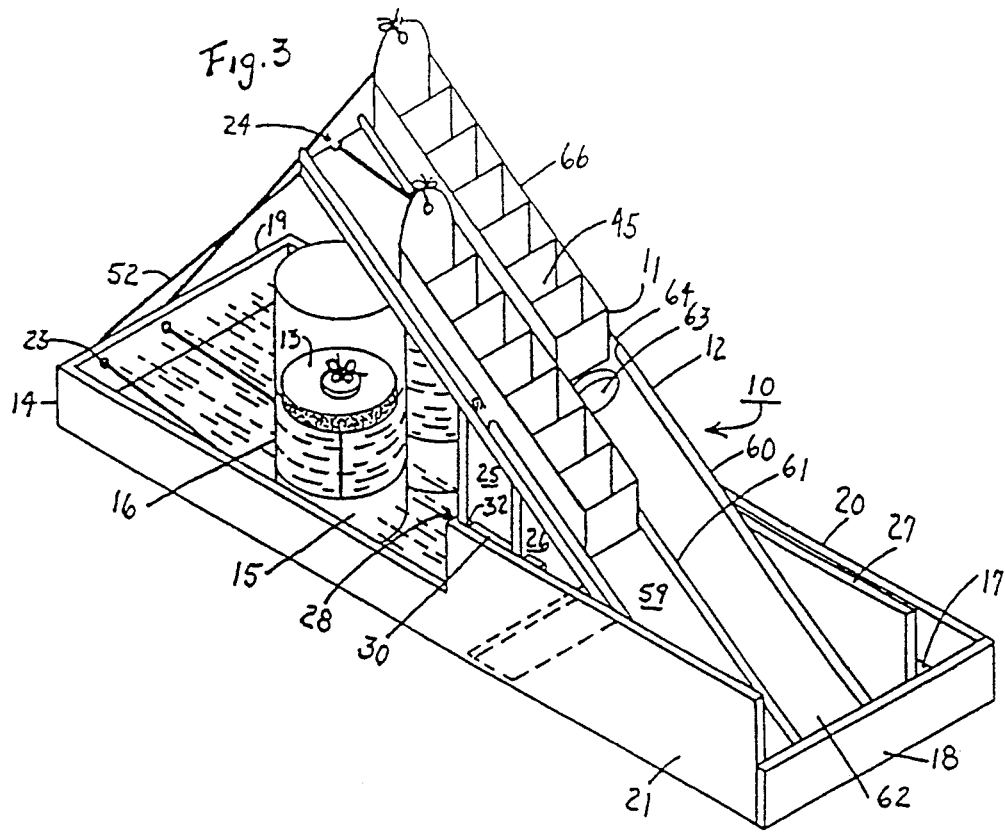
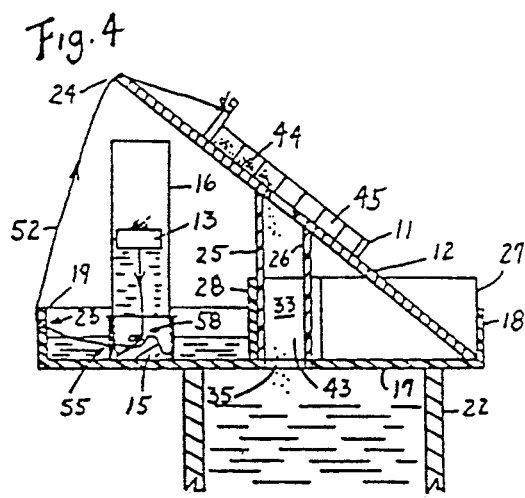
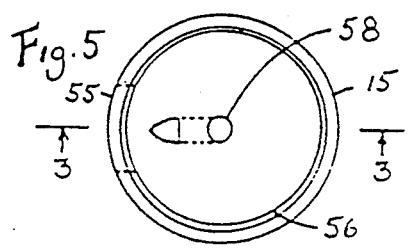
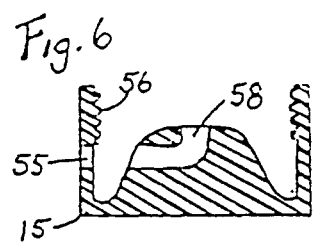
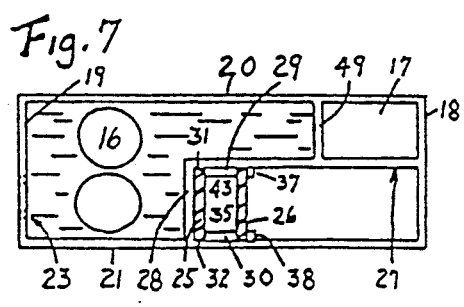
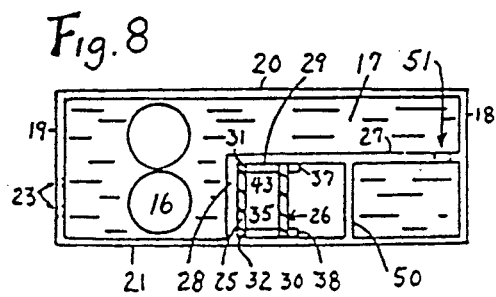

5,138,978

AQUATIC ANIMAL FEEDING ASSEMBLY

BACKGROUND OF THE INVENTION

1 Field of the Invention

The present invention relates in general to an animal feeding assembly and more particularly relates to an assembly for dispensing automatically feed to animals, such as fish swimming in an aquarium, at periodic intervals of time.

2 Description of the Prior Art

There are a number of automated assemblies making up the prior art. Most of these are complex configurations of timed relays controlling electric motors which drive augers, rotary disks or pistons across openings in feed hoppers. Their complexity necessitates high production costs. The great number of interacting elements compounds the possibility of malfunction, particularly as a result of the corrosion of electrical conductors by the humid or even wet conditions in which they must operate. In addition, most of these assemblies must compete with more essential devices of an aquarium set-up, such as heaters, air pumps and lights, for a limited number of electrical outlets.

There are a few assemblies that operate using evaporation as a time control and gravity as a means of motivation. For example, reference may be made to the following U.S. Pat. Nos. 2,900,022; 2,905,144; and 4,130,089. Evaporation is used to trip levers either by using a liquid in counterbalance to feed held at the opposite end of a fulcrum, or by tripping release mechanisms as a float, suspended on the evaporating surface of an aquarium, descends. These assemblies are generally bulky and require direct access to an open aquarium. In addition these assemblies require a great deal of fine tuning by their end-users to meet individual requirements.

Thus, it would be highly desirable to have an automatic feeding assembly that is a compact, durable, independent assembly which is simple to construct and operate, and depends on the most basic of principles for its operation.

SUMMARY OF THE INVENTION

A major object of the present invention is to use evaporation as a control mechanism to restrain the gravitational pull on a train which empties feed into an aquarium accessing chute as it passes over an aperture in its path. In the following description the additional objects of simplicity of operation, simplicity of construction and self-contained operation, will become evident.

The delivery system is a train divided into feed compartments. The train is mounted between guide ridges on a smooth surfaced ramp that forms a bottom for the train. The end-user fills each compartment with a day's feed supply of his or her choosing. The ramp is held in a sloping position by the chute, which gives the aperture contained in the ramp access to the aquarium beneath, and by the abutment of one end against an end wall of a supporting evaporation tray. The train is attached via a series of guides to a string which is attached to a float in a reservoir suspended in fluid communication above an evaporation tray containing a liquid. The reservoir is essentially an elongated hollow cylinder supported vertically within the tray by a cap affixed to the tray. A slot contained in the cap allows the reservoir to communicate with the tray. Liquid evaporating from the tray is replaced by liquid from the reservoir, causing the float to descend with the displacement of liquid. Movement of the float is passed on via the string to the train, allowing it to advance over the aperture in the ramp and release some of the feed. The ratio of the surface area of the liquid in the reservoir to the surface area of the liquid in the tray, determines the rate at which the train advances. This ratio is fixed at the time of manufacture, such that the train advances the length of one compartment each day.

BRIEF DESCRIPTION OF THE DRAWING

FIG. 1 is an exploded view of the elements comprising the invention.

FIG. 2 is a top view of the invention operatively disposed atop an aquarium tank.

FIG. 3 is a perspective drawing of the invention.

FIG. 4 is a cross-section of FIG. 2 taken along line 2—2.

FIG. 5 is a top view a cap element contained in the invention

FIG. 6 is a cross-section of FIG. 5 taken along line 3—3

FIG. 7 is a top view of an evaporation tray element contained in the invention and shown with a special wall to limit the evaporation surface.

FIG. 8 is a top view of an evaporation tray element contained in the invention and shown with means for expanding the evaporation surface.

DESCRIPTION OF THE ILLUSTRATED EMBODIMENTS

Referring now to the drawings, wherein like reference characters designate like or corresponding parts throughout the several views, there is shown in FIGS. 2 and 4 an aquatic animal feeding assembly 10 disposed atop an aquarium tank 22. As shown in FIGS. 1, 3 and 4, the assembly 10 comprises at least one compartmentalized train 11, at least one ramp 12, at least one float 13, an evaporation tray 14, at least one cap 15 and at least one reservoir 16.

The evaporation tray 14 may take on many shapes depending on the needed liquid displacement from the reservoir 16 to advance the train 11. The tray 14 is substantially a rectangular container, as best shown in FIGS. 7 and 8, comprising a bottom wall 17, opposing front 18 and rear 19 walls and opposing far side 20 and near side 21 walls extending upwardly from the bottom wall 17 and substantially normal thereto. The rear wall 19 has advantageously cut therein at least one guide hold 23 above the normal operating liquid level and vertically beneath an appropriate guide notch 24 cut in the upper operating extremity of the ramp 12.

Within the tray 14 is a means for affixing a removable tall ramp support 25 and a removable short ramp support 26. A guide wall 27 parallel to and between the far side wall 20 and the near side wall 21 extends from the front wall 18 and rises upwardly from the bottom wall 17 and substantially normal thereto, at a distance from the near side wall 21 of approximately the same as, but not less than, the width of the ramp 12. The guide wall 27 merges with a support wall 28 extending at right angles from a position generally centrally located in the near side wall 21 and running in a parallel plane to the front wall 18. The guide wall 27, the support wall 28 and that portion of the near side wall 21 directly opposite the guide wall 27, rise from the bottom wall 17 to a level at least flush with the upper edges of the front wall 18, the rear wall 19 and the far side wall 22, and preferably to a height approximately equal to the diameter of the reservoir 16. Adjacent to the support wall 28, resembling solid rectangular parallelepipeds and protruding from the guide wall 27 and from the near side wall 21, are chute members 29 and 30 respectively. Containing surfaces 31 and 32 of the chute members 29 and 30 are intended to contain the tall ramp support 25 upright and in juxtaposition with the support wall 28. Containing surfaces 31 and 32 extend from the guide wall 27 and the near side wall 21 respectively, at a distance from the support wall 28 of not less than, but essentially the same measure as, the thickness of the tall ramp support 25, and extend normally from the bottom wall 17 in a parallel plane to the support wall 28. At right angles to the containing surfaces 31 and 32 are chute surfaces 33 and 34 respectively. Opposite the containing surfaces 31 and 32 and separated at right angles by chute surfaces 33 and 34, are support surfaces 39 and 40 respectively. A passage 35 is cut through the bottom wall 17 flush with the bottom edges of the chute surfaces 33 and 34, and along a line extending between the bottom edges of the containing surfaces 31 and 32 and along a line extending between the bottom edges of the support surfaces 39 and 40. Extending from the guide wall 27 and the near side wall 21, and rising in a normal plane from the bottom wall 17 at a distance from the support surfaces 39 and 40 of essentially the same measure as, but not less than, the width of the short ramp support 26, are guide surfaces 41 and 42 respectively of guide members 37 and 38 respectively. In use the tall ramp support 25 is held between the support wall 28 and the containing surfaces 31 and 32 and rests on the bottom wall 17 which forms a ledge 36, as shown in FIG. 1, extending beyond the support wall 28 a distance essentially the same as, but not greater than, the thickness of the tall ramp support 25. Similarly, the short ramp support rests on the bottom wall 17 between the guide surfaces 41 and 42, and the support surfaces 39 and 40. When in position, the tall ramp support 25 and the short ramp support 26 hold the ramp 12, and together with the chute surfaces 33 and 34 form a chute 43 through which feed 44 may pass to the aquarium tank 22.

The overall size of the assembly 10 is generally a function of the required number of feedings. However, because the size of a compartment 45 in the train 11 remains constant, a down scaling requires a larger evaporating surface than a proportional reduction, according to the number of feedings, would require. As shown in FIG. 7 a limiting wall 49 joining the far side wall 20 and the guide wall 27 from any point along the guide wall 27 and rising from the bottom wall 17 normally to a height at least flush with the far side wall 20, may be required in large assemblies. As shown in FIG. 8, a barrier wall 50 joining the near side wall 21 and the guide wall 27 from any point between an opening 51, at the base of the guide wall 27 and adjacent to the front wall 18, and the guide member 37 inclusive, is required in small assemblies. The opening 51 allows fluid communication between both sides of the guide wall 27. The barrier wall 50 rises normally from the bottom wall 17 to a height at least equal to the height of the front wall 18 and creates a non-permeable barrier for the passage 35.

The reservoir 16 is essentially a hollow elongated cylinder closed at one end and open at the other. The open end has threads 57 cut into its outer surface. When filled with a liquid, the reservoir 16 advantageously contains the float 13, as best shown in FIGS. 3 and 4.

The cap 15 is a hollow cylinder of slightly larger circumference than the reservoir 16. It has an open end with threads 56 cut in its inside surface to mesh with the reservoir threads 57. A slot 55, advantageously contained in the cap 15, runs parallel to the open edge and faces the guide hold 23.

The reservoir 16 containing the float 13, suspended in the liquid, can be engaged with the cap 15 by first inverting the tray 14 over the reservoir 16 and threadably securing it to the cap 15. When the reservoir 16 is fully engaged with the cap 15, there is no communication between the cap 15 and the tray 14, hence; the tray 14 may be inverted back to its operating position without losing any of the liquid. The tray 14 is then filled with the liquid to a level just above the upper edge of the slot 55. If the reservoir 16 is backed off to a position just above the upper edge of the slot 55, the reservoir advantageously communicates with the tray 14 via the slot 55. As long as the liquid in the tray covers the slot 55, the liquid in the reservoir remains sealed. As the liquid contained in the tray 14 evaporates, the slot 55 becomes exposed to air causing the seal to break and the reservoir liquid to escape and replace the evaporated liquid. Thus, the float 13 descends with the descending liquid level in the reservoir 16. In applications using more than one reservoir 16, the sequencing of reservoir activity is determined by the height above the bottom wall 17 of the upper edge of the slot 55. The reservoir 16 communicates through the slot 55 with the greatest vertical distance to its upper edge first, followed by the one with the next highest, in a sequence according to heights.

The means for transmitting the movement of the float 13 to the train 11 is essentially a series of guides and a pliable string 52 of non-shrinking, non-stretching material. The string 52 is attached to a button 53 and fed through a duct 54, contained centrally to the vertical axis of the float 13 and of a diameter substantially less than the diameter of the button 53, and through a guide 58 centrally located in the cap 15, as shown in FIGS. 4, 7 and 8, the guide 58 assures the smooth descent of the float 13 and also directs the string 52 at an angle to the slot 55. The string 52 is fed through the slot 55, through the guide hole 23, across the notch 24 contained in the ramp 12 and is attached to the train 11.

The tall ramp support 25 is of greater height than the short ramp support 26 so as to hold the ramp 12 in a diagonal position sloping down toward the front wall 18. Both the tall ramp support 25 and the short ramp support 26 have bases that are at right angles to their upright surfaces which permit them to rest flush on the bottom wall 17. The tops of the tall ramp support 25 and the short ramp support 26 are cut at such an angle and at such a height that the ramp 12 rests flushly on them when the ramp 12 is abutted against the front wall 18.

The ramp 12 is generally rectangular in shape with a smooth rectangular upper surface 59 contained along its length by outer guide ridges 60. The outer guide ridges 60 and additional ridges 61 are spaced so as to form a channel 62 for the free passage of the train 11 down the ramp 12. One end of the ramp 12 has the guide notch 24 cut central to the channel 62 and the other end is cut at an angle that allows the maximum surface contact with the bottom wall 17 when abutting the front wall 18. About mid-way along the ramp 12 and contained therein, is cut an aperture 63 is at right angles to the path followed by the train 11. Close to the aperture 63 and on the guide notch 24 side, is cut a gap 64, through the outer guide ridges 60 and the additional guide ridges 61, to hold a stop 65, as shown in FIG. 1. When placed in the gap 64, the stop 65 restrains the train 11 while the ramp 12 is placed in position and the train 11 is being attached to the string 52.

The train 11 has two identical rectangular plates 66 of length slightly less than half the length of the ramp 12, separated by a plurality of partitions 46 extending between them. An end partition 47 preferably rises above the other partitions 46 and contains an orifice 48 for attaching the train 11 to the string 52. When the train 11 is mounted on the ramp 12, it is essential that the partitions 46 and the bottom edges of the plates 66 make continuous contact with the upper surface 59. The feed 44 is pushed along by the advancing train 11 and scraped across the aperture 63 to fall into the chute 43 and exit the passage 35 into the aquarium tank 22.

Any materials may be used to construct the assembly hereinbefore described. However, the materials used in the preferred embodiment may be plastic formed in the various configurations described and shown, or formed as components thereof and adhesively assembled to form the configurations.

While in accordance with the patent statutes I have illustrated and described the best forms and embodiments of my invention now known to me, it will be apparent to those skilled in the art that other changes may be made in the assembly described without deviating from the scope of my invention as set forth in the following claims.

I claim:

1. An aquatic animal feeding assembly which operates disposed across an open aquarium or atop an aquarium hood accessing the aquarium which comprises:
   at least one float;
   at least one air tight reservoir to contain the float in liquid suspension therein;
   at least one bottomless compartmentalized train for the storage and delivery of feed;
   at least one ramp with a smooth surface that forms a bottom for the train, when the train is mounted on the ramp between guide ridges rising from the surface of the ramp, and that contains an aperture through which the train empties the feed;
   at least one cap which can hold the reservoir in one of two positions, a sealingly engaged position and another position that allows fluid and mechanical communication with the rest of the assembly;
   an evaporation tray for the containment of the liquid, for affixing the cap which holds the reservoir above and allows fluid and mechanical communication with the tray, for affixing ramp supports and for containing a passage for the delivery of the feed to the aquarium; and
   a means for transmitting the downward movement of the float, caused by the displacement of the liquid from the reservoir to replace the liquid that has evaporated in the tray, into movement of the train.

2. The assembly in accordance with claim 1 wherein the reservoir comprises an elongated hollow cylinder open at one end and containing threads at that end to secure it to the cap.

3. The assembly in accordance with claim 2 wherein the train comprises two generally rectangular plates separated by and affixed to a plurality of partitions which meet the bottom edges of the plates flushly and at right angles forming four-sided compartments open at top and bottom and having contained within one end partition means for attaching the train to the means for transmitting the downward movement of the float.

4. The assembly in accordance with claim 3 wherein the ramp contains at one end a guide notch central to a channel formed by the ridges and has the other end cut at such an angle that it rests flushly on the tray.

5. The assembly in accordance with claim 4 wherein the cap contains threads for receiving the reservoir, contains a slot that determines the liquid level in the tray by displacement of the liquid from the reservoir when evaporation exposes the slot to air, and a centrally located cap guide.

6. The assembly in accordance with claim 5 further comprising a plurality of caps, each with its own reservoir, each cap in said plurality containing a slot of height to its upper edge different from the other caps in said plurality, so as to sequence the activation of the reservoirs.

7. The assembly in accordance with claim 5 wherein the ramp supports hold the ramp in a sloping position and together with a means for affixing the ramp supports to the tray form a chute beneath the aperture to connect the passage through the tray.

8. The assembly in accordance with claim 7 wherein the means for affixing the ramp supports comprises vertical members extending out from the tray, spaced so as to contain the supports tightly when the supports rest on the tray.

9. The assembly in accordance with claim 8 wherein the means for transmitting the downward movement of the float comprises a pliable string attached at one end to a button and threaded through a duct in the float, through the cap guide, through the slot, through the tray containing a guide hole, across the notch in the ramp and attached to the train having an orifice for tying the string.

10. Apparatus for introducing feed into an aquarium, comprising:
   a) tray means positionable above an aquarium, said tray means having upstanding peripheral and internal walls for containment of an evaporation liquid, and a feed opening therethrough directed towards the aquarium;
   b) chute means extending upwardly from said opening;
   c) ramp means angularly supported above said chute means, said ramp means having an opening therethrough communicating with said chute means;
   d) compartment means slidable on said ramp means and having a plurality of longitudinally adjacent, open-bottomed, feed receiving compartments therein;
   e) reservoir means in said tray means;
   f) float means contained in said reservoir means; and
   g) flexible means connecting said float means to said compartment means;

whereby: with said tray means containing a first volume of evaporation liquid, said reservoir means containing a second volume of evaporation liquid, at least one of said compartments containing feed, and said compartment means, at an upper end of said ramp means, being connected by said flexible means to said float means, the evaporation of liquid from said first volume results in replenishment from said second volume with a consequent descent of said float means and a concurrent descent of said compartment means along said ramp means so that feed from a compartment will fall through said ramp opening, said chute means and said feed opening into the aquarium.

* * * * *